US012669070B2

(12) United States Patent
Lefebvre et al.

(10) Patent No.: US 12,669,070 B2
(45) Date of Patent: Jun. 30, 2026

(54) TURBOCOMPRESSOR UNIT FOR AN AIRCRAFT PROPULSION SYSTEM

(71) Applicant: Pratt & Whitney Canada Corp., Longueuil (CA)

(72) Inventors: Guy Lefebvre, St-Bruno (CA); Remy Synnott, St-Jean-sur-Richelieu (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/941,784

(22) Filed: Nov. 8, 2024

(65) Prior Publication Data

US 2026/0132725 A1 May 14, 2026

(51) Int. Cl.
*F01D 25/30* (2006.01)
*F01D 9/02* (2006.01)

(52) U.S. Cl.
CPC ............... *F01D 25/30* (2013.01); *F01D 9/02* (2013.01); *F05D 2220/323* (2013.01); *F05D 2240/12* (2013.01); *F05D 2260/60* (2013.01)

(58) Field of Classification Search
CPC .......... F01D 25/12; F01D 25/14; F01D 25/24; F01D 25/30; F01D 5/04; F01D 5/043; F01D 5/18; F01D 5/187; F01D 5/188; F01D 5/189; F01D 9/02; F01D 9/026; F01D 9/04; F01D 9/045; F01D 9/048; F01D 9/06; F01D 9/065; F01D 17/14; F01D 17/16; F01D 17/162; F01D 17/165; F05D 2220/323; F05D 2220/40; F05D 2240/12; F05D 2260/60; F05D 2210/43; F02C 3/04; F02B 37/02; F02B 37/025
See application file for complete search history.

(56) References Cited

U.S. PATENT DOCUMENTS

| | | | |
|---|---|---|---|
| 2,801,518 | A | 8/1957 | Wosika |
| 7,305,826 | B2 | 12/2007 | Kuster |
| 10,753,370 | B2 | 8/2020 | Hall |

(Continued)

FOREIGN PATENT DOCUMENTS

| | | |
|---|---|---|
| EP | 2685054 B1 | 11/2020 |

OTHER PUBLICATIONS

EP Search Report for EP Patent Application No. 25214665.9 dated Mar. 19, 2026.

*Primary Examiner* — Loren C Edwards
(74) *Attorney, Agent, or Firm* — Getz Balich LLC

(57) ABSTRACT

An aircraft propulsion system includes a turbocompressor unit, an engine exhaust assembly, and a tube assembly. The turbocompressor unit includes a compressor, a turbine, a turbocompressor rotational assembly, and a static structure. The static structure forms a first cavity and a second cavity. The engine exhaust assembly includes an annular scroll disposed between the first cavity and the second cavity. The annular scroll includes a scroll body and a plurality of hollow stator vanes. The plurality of hollow stator vanes is disposed within the flow channel. The tube assembly includes a tubular body. The tubular body extends through one of the plurality of hollow stator vanes between and to the first cavity and the second cavity. The tubular body forms an internal passage extending from the first axial tube end to the second axial tube end. The internal passage connects the first cavity in fluid communication with the second cavity.

20 Claims, 7 Drawing Sheets

(56) References Cited

U.S. PATENT DOCUMENTS

| | | | | |
|---|---|---|---|---|
| 12,065,950 | B1 | 8/2024 | Lefebvre | |
| 2015/0345376 | A1* | 12/2015 | Ibaraki | F01D 5/18<br>60/605.1 |
| 2024/0328323 | A1 | 10/2024 | Marini | |
| 2025/0003354 | A1 | 1/2025 | Lefebvre | |

* cited by examiner

TURBOCOMPRESSOR UNIT FOR AN AIRCRAFT PROPULSION SYSTEM

TECHNICAL FIELD

This disclosure relates generally to aircraft propulsion systems, and more particularly to air flow arrangements for turbocompressors.

BACKGROUND OF THE ART

Engines for aircraft may typically include rotational equipment configured for facilitating aircraft propulsion and/or other functions of aircraft propulsion system operation. In many cases, rotational equipment components and supporting static structures may require cooling, for example, using air from one or more compressed air sources. Various systems for distributing cooling air are known in the art. While these known systems may be useful for their intended purposes, there is always room in the art for improvement.

SUMMARY

According to an aspect of the present disclosure, an aircraft propulsion system includes a turbocompressor unit, an engine exhaust assembly, and a tube assembly. The turbocompressor unit includes a compressor, a turbine, a rotational assembly, and a static structure. The rotational assembly is rotatable about a rotational axis. The rotational assembly includes a bladed compressor rotor of the compressor, a bladed turbine rotor of the turbine, and a shaft. The shaft interconnects the bladed compressor rotor and the bladed turbine rotor. The static structure forms a first cavity and a second cavity. The first cavity is connected in fluid communication with the compressor. The second cavity is disposed at the turbine. The engine exhaust assembly includes an annular scroll disposed between the first cavity and the second cavity. The annular scroll includes a scroll body and a plurality of hollow stator vanes. The scroll body forms a flow channel connected in fluid communication with the turbine. The plurality of hollow stator vanes is disposed within the flow channel and circumferentially distributed about the rotational axis. The tube assembly includes a tubular body. The tubular body extends along a tube axis between and to a first axial tube end and a second axial tube end. The tubular body extends through one of the plurality of hollow stator vanes between and to the first cavity and the second cavity. The tubular body forms an internal passage extending along the tube axis from the first axial tube end to the second axial tube end. The internal passage connects the first cavity in fluid communication with the second cavity.

In any of the aspects or embodiments described above and herein, the scroll body may extend axially between and to a first axial scroll end and a second axial scroll end, and the scroll body may form a portion of the second cavity at the second axial scroll end.

In any of the aspects or embodiments described above and herein, the tubular body may be mounted to the scroll body at the second axial scroll end.

In any of the aspects or embodiments described above and herein, the scroll body may form a third cavity at the first axial scroll end, and the tubular body may extend through the third cavity to the first cavity.

In any of the aspects or embodiments described above and herein, the third cavity may be a dead cavity.

In any of the aspects or embodiments described above and herein, the tube assembly may further include a sealing body mounted on the static structure at the first cavity, the sealing body may include an inner sealing surface extending circumferentially about the tube axis, and the first axial tube end may be disposed within the sealing body at the inner sealing surface.

In any of the aspects or embodiments described above and herein, the tube assembly may further include a seal disposed at the first axial tube end, and the seal may be disposed in sealing engagement with the inner sealing surface.

In any of the aspects or embodiments described above and herein, the first axial tube end may be axially translatable relative to the inner sealing surface along the tube axis.

In any of the aspects or embodiments described above and herein, the aircraft propulsion system may further include an engine including an exhaust port, and the flow channel may form a portion of a combustion gas flow path from the exhaust port to the turbine.

In any of the aspects or embodiments described above and herein, the static structure may further include a bearing assembly mounted to rotationally support the shaft, and the bearing assembly may be connected in fluid communication with the first cavity.

According to another aspect of the present disclosure, an aircraft propulsion system includes a turbocompressor unit, an engine exhaust assembly, and a tube assembly. The turbocompressor unit includes a compressor, a turbine, a rotational assembly, and a static structure. The rotational assembly is rotatable about a rotational axis. The rotational assembly includes a bladed compressor rotor of the compressor, a bladed turbine rotor of the turbine, and a shaft, the shaft interconnecting the bladed compressor rotor and the bladed turbine rotor. The static structure forming a first cavity and a second cavity. The first cavity is connected in fluid communication with the compressor. The second cavity is disposed at the turbine. The engine exhaust assembly includes an annular scroll axially between the compressor and the turbine. The annular scroll including a scroll body and a plurality of hollow stator vanes. The scroll body includes a first axial side wall, a second axial side wall, and an outer wall forming a flow channel of the annular scroll. The flow channel is connected in fluid communication with the turbine. The plurality of hollow stator vanes extend between and to the first axial side wall and the second axial side wall. The tube assembly includes a tubular body. The tubular body extends along a tube axis between and to a first axial tube end and a second axial tube end. The second axial tube end is mounted to the second axial side wall. The tubular body extends through one of the plurality of hollow stator vanes between and to the first cavity and the second cavity. The tubular body forms an internal passage extending along the tube axis from the first axial tube end to the second axial tube end. The internal passage connects the first cavity in fluid communication with the second cavity.

In any of the aspects or embodiments described above and herein, the static structure may include a turbine case circumscribing the bladed turbine rotor, and the second cavity may be disposed radially outward of the turbine case.

In any of the aspects or embodiments described above and herein, the scroll body may form a third cavity, and the tubular body may extend through the third cavity to the first cavity.

In any of the aspects or embodiments described above and herein, the third cavity may be a dead cavity.

In any of the aspects or embodiments described above and herein, the static structure may further include a bearing assembly mounted to rotationally support the shaft, and the bearing assembly may be connected in fluid communication with the first cavity.

According to another aspect of the present disclosure, an aircraft propulsion system includes a turbocompressor unit, an engine exhaust assembly, and a tube assembly. The turbocompressor unit includes a compressor, a turbine, a rotational assembly, and a static structure. The rotational assembly is rotatable about a rotational axis. The rotational assembly includes a bladed compressor rotor of the compressor, a bladed turbine rotor of the turbine, and a shaft. The shaft interconnects the bladed compressor rotor and the bladed turbine rotor. The static structure forms a first cavity and a second cavity. The first cavity is connected in fluid communication with the compressor. The second cavity is disposed at the turbine. The engine exhaust assembly includes an annular scroll disposed between the first cavity and the second cavity. The annular scroll includes a scroll body and a plurality of hollow stator vanes. The scroll body forms a flow channel connected in fluid communication with the turbine. The plurality of hollow stator vanes is disposed within the flow channel and circumferentially distributed about the rotational axis. The tube assembly includes a tubular body, a seal, and a sealing body. The tubular body extends along a tube axis between and to a first axial tube end and a second axial tube end. The tubular body extends through one of the plurality of hollow stator vanes between and to the first cavity and the second cavity. The tubular body forms an internal passage extending along the tube axis from the first axial tube end to the second axial tube end. The internal passage connects the first cavity in fluid communication with the second cavity. The tubular body forms a seal groove at the first axial tube end. The seal is disposed in the seal groove. The sealing body is mounted on the static structure at the first cavity. The seal is sealingly engaged with the sealing body. The first axial tube end is moveable within the sealing body.

In any of the aspects or embodiments described above and herein, the tubular body may be mounted to the scroll body.

In any of the aspects or embodiments described above and herein, the scroll body may extend axially between and to a first axial scroll end and a second axial scroll end, and the scroll body may form a portion of the second cavity at the second axial scroll end.

In any of the aspects or embodiments described above and herein, the tubular body may be mounted to the scroll body at the second axial scroll end.

In any of the aspects or embodiments described above and herein, the aircraft propulsion system may further include an engine including an exhaust port, and the flow channel may form a portion of a combustion gas flow path from the exhaust port to the turbine.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
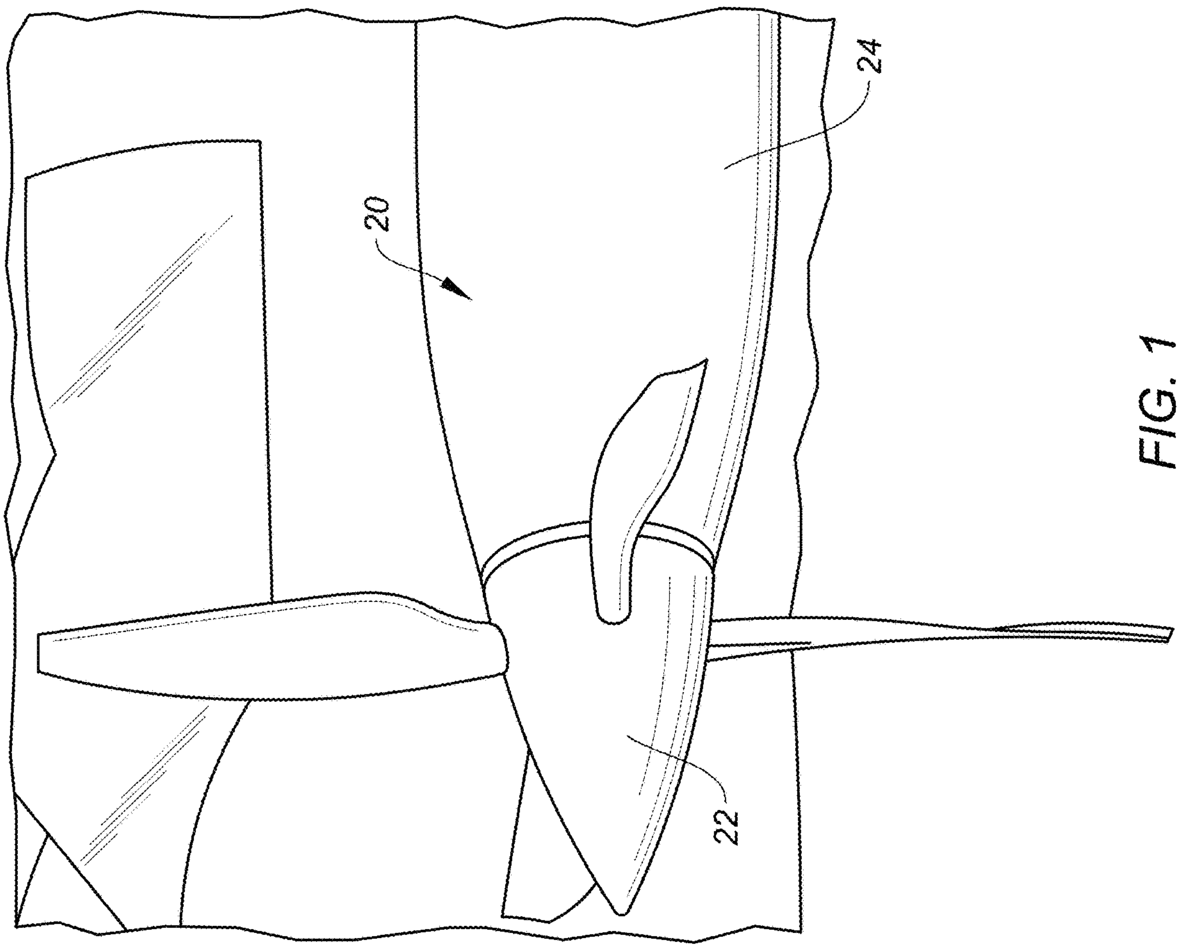
FIG. 1 illustrates a perspective view of an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The propulsion system 20 shown in FIG. 1 includes a propulsor 22 (e.g., a propeller) and a nacelle 24. The nacelle 24 forms an exterior, aerodynamic housing for the propulsion system 20.

Figure 2:
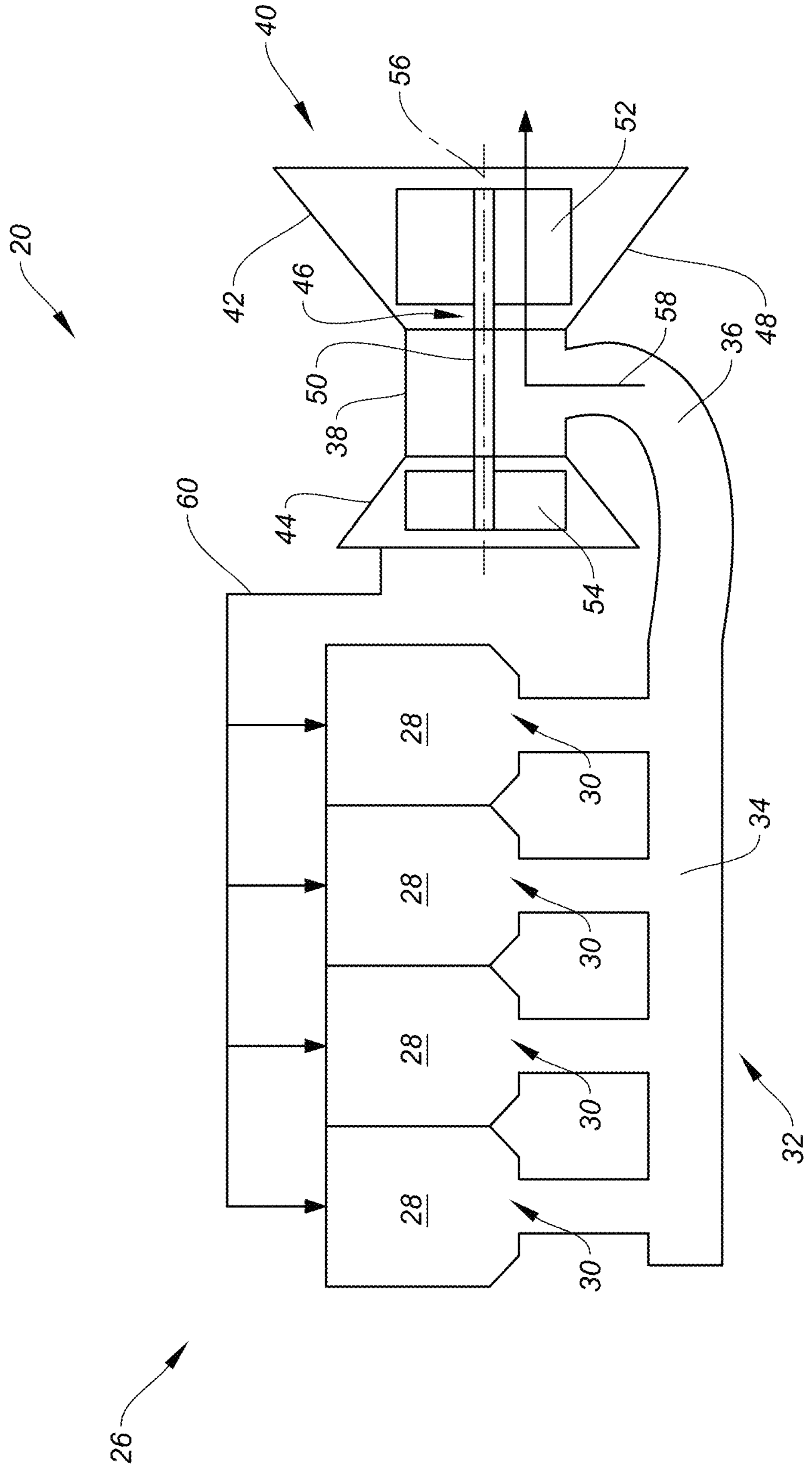
FIG. 2 schematically illustrates a cutaway, side view of an engine for an aircraft propulsion system, in accordance with one or more embodiments of the present disclosure.

Referring to FIG. 2, an example of an internal combustion engine for the propulsion system 20 (see FIG. 1) is schematically shown in the form of a rotary engine 26. The present disclosure is not limited to use with rotary engines. The engine 26 includes a plurality of similar axially aligned rotary units 28 driving a common eccentric shaft (e.g., coupled with the propulsor 22; see FIG. 1). The engine 26 shown schematically in FIG. 2 includes four rotary units 28 but it should be understood that the engine 26 may alternatively include any quantity of rotary units 28. The present disclosure is not limited to use with any particular rotary engine configuration. Each of the rotary units 28 includes an exhaust port 30 for collecting combustion gas produced in the respective rotary unit 28.

Figure 3:
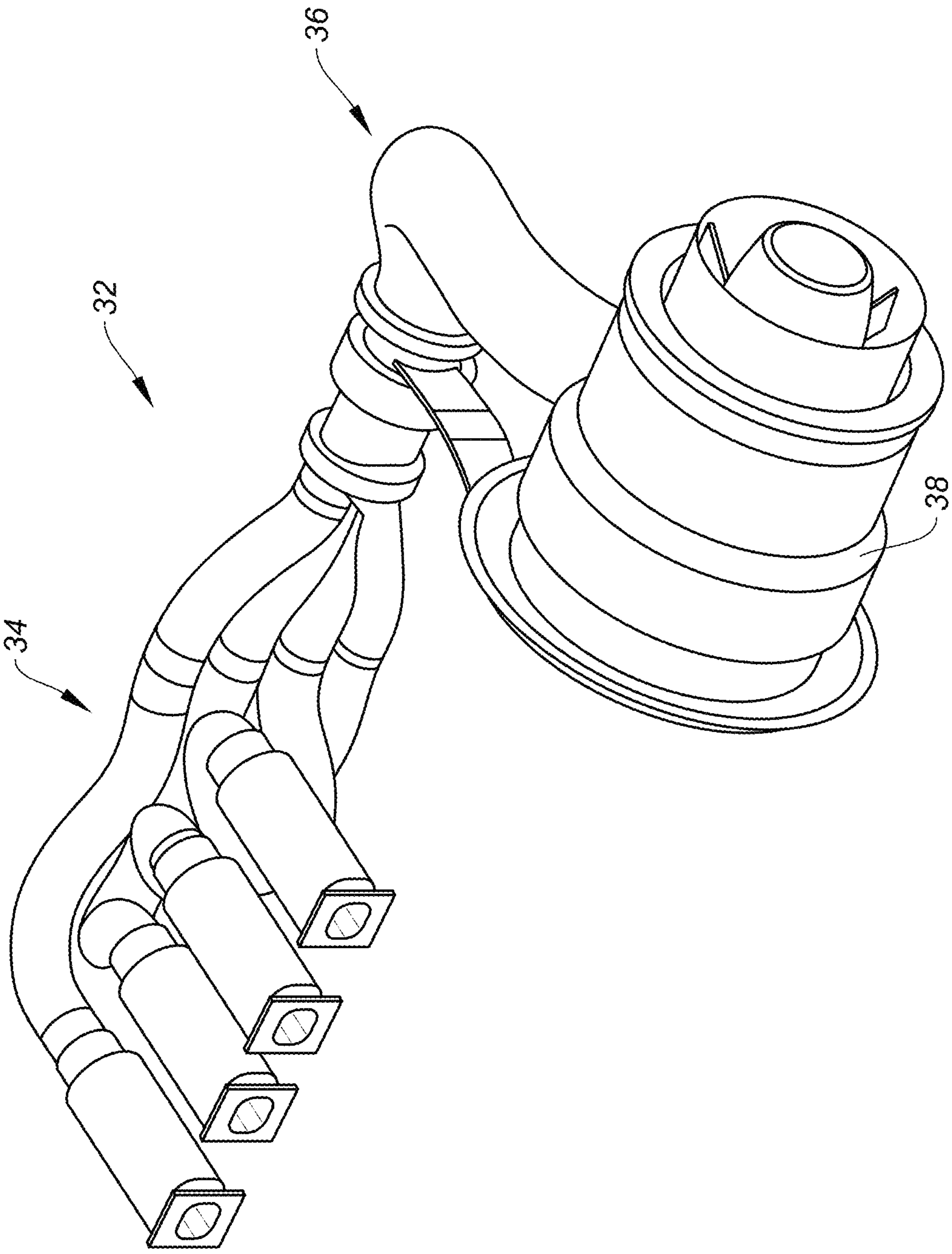
FIG. 3 illustrates a perspective view of an exhaust assembly for the engine of FIG. 2, in accordance with one or more embodiments of the present disclosure.

The engine 26 of FIG. 2 includes an exhaust assembly 32. FIG. 3 illustrates a perspective view of the exhaust assembly 32. The exhaust assembly 32 includes an exhaust manifold 34 (sometimes referred to as an "exhaust header"), an exhaust pipe 36, and a scroll 38. The exhaust manifold 34 is configured to be connected in fluid communication with the exhaust ports 30. The exhaust pipe 36 connects the exhaust manifold 34 to the scroll 38 (sometimes referred to as a "volute").

The engine 26 of FIG. 2 further includes or is otherwise connected in fluid communication with a turbocompressor unit 40. The turbocompressor unit 40 includes a turbine 42, a compressor 44, a rotational assembly 46, and a turbocompressor static structure 48. The turbine 42 is connected in fluid communication with the exhaust assembly 32 (e.g., the scroll 38). The compressor 44 is connected in fluid communication with the rotary units 28. The rotational assembly 46 includes a shaft 50, a bladed turbine rotor 52 for the turbine 42, and a bladed compressor rotor 54 for the compressor 44. The shaft 50 interconnects the bladed turbine rotor 52 and the bladed compressor rotor 54. The rotational assembly 46 is configured for rotation about an axis 56 (e.g., a rotational axis) relative to the turbocompressor static structure 48.

Each rotary unit 28 of the engine 26 operates in a cyclic manner, periodically producing combustion gas. A collective combustion gas flow 58 of the combustion gas from the rotatory units 28 and their respective exhaust ports 30 is directed into and through the exhaust assembly 32. The scroll 38 organizes this combustion gas flow 58 for entry into the turbine 42. The combustion gas flow 58 through the turbine 42 drives rotation of the bladed turbine rotor 52 and, therefore, the rotational assembly 46. The rotation of the bladed compressor rotor 54 compresses air in the compressor 44, and a compressed air flow 60 from the compressor 44 is directed to the rotary units 28 to facilitate combustion therein.

Figure 4:
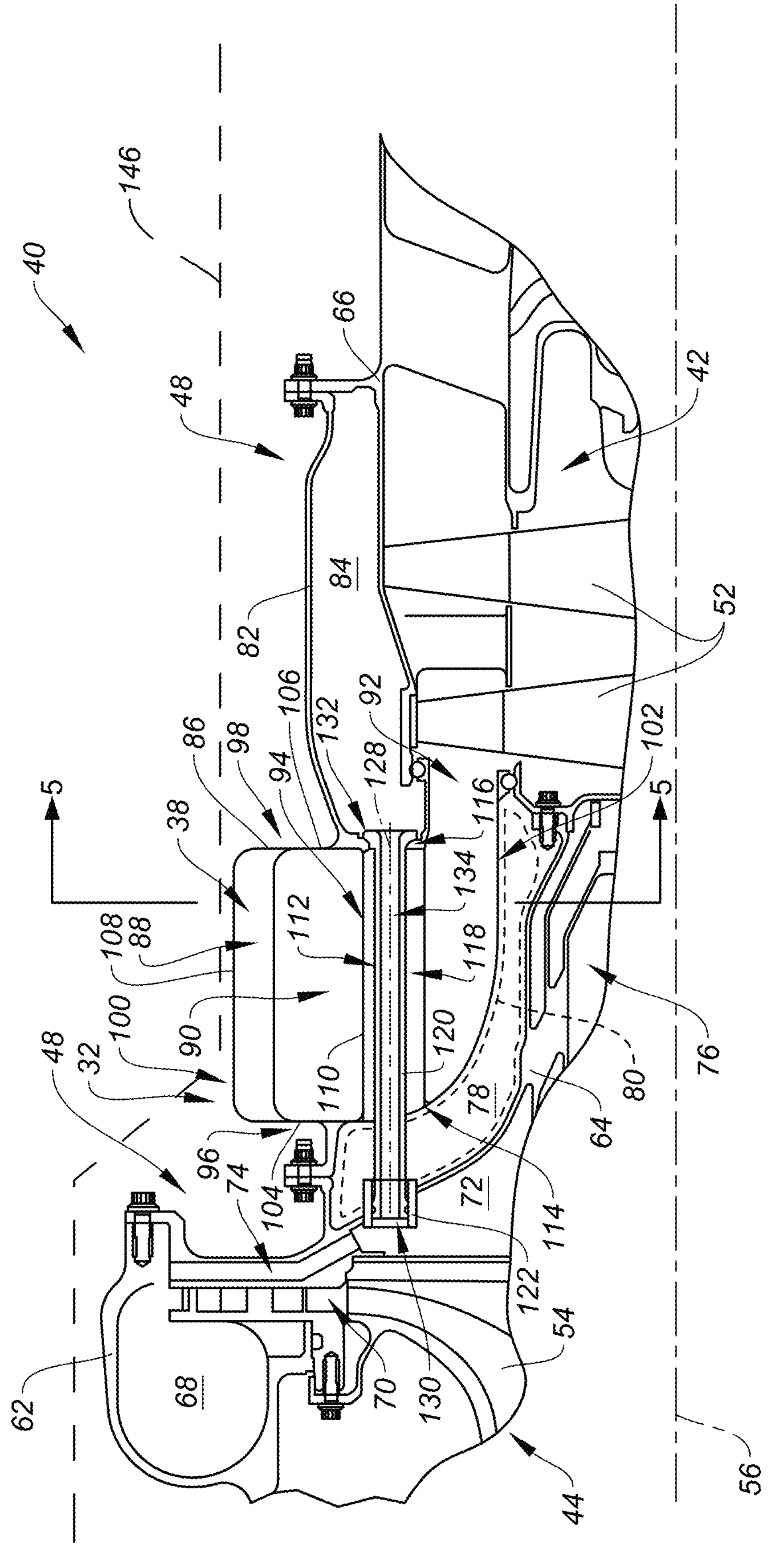
FIG. 4 schematically illustrates a cutaway, side view of the exhaust assembly and a turbocompressor unit for the engine of FIG. 2, in accordance with one or more embodiments of the present disclosure.

FIG. 4 schematically illustrates a cutaway, side view of the scroll 38 and the turbocompressor unit 40 including portions of the turbine 42, the compressor 44, the rotational assembly 46, and the turbocompressor static structure 48. As shown in FIG. 4, the scroll 38 and the turbocompressor static structure 48 form a number of cavities within the turbocompressor unit 40. The turbocompressor static structure 48 of FIG. 4 includes, for example, a compressor case 62, a bearing compartment housing 64, and a turbine case 66. The compressor case 62 forms a compressor outlet cavity 68 at (e.g., on, adjacent, or proximate) a discharge 70 of the compressor 44. The compressor case 62 and the bearing compartment housing 64 form a bearing compartment inlet cavity 72. The bearing compartment inlet cavity 72 is connected in fluid communication with the compressor outlet cavity 68 by one or more air supply passages 74 extending between and to the compressor outlet cavity 68 and the bearing compartment inlet cavity 72. The air supply passages 74 may be formed, for example, by the bearing compartment housing 64. Compressed air supplied from the compressor outlet cavity 68 to the bearing compartment inlet cavity 72 through the air supply passages 74 may facilitate buffering and cooling of a bearing compartment 76 formed by the bearing compartment housing 64, as well as components (e.g., bearings and seals) disposed therein. The bearing compartment housing 64 and the scroll 38 form an insulating cavity 78 therebetween. The insulating cavity 78 is a "dead cavity" which is isolated, sealed, or otherwise separated from fluid communication with surrounding cavities (e.g., the bearing compartment inlet cavity 72, the bearing compartment 76, the combustion gas flow 58 path, etc.) such that there is no or substantially no fluid (e.g., air) flow through or within the insulating cavity 78. The insulating cavity 78, positioned between the scroll 38 on one side and the bearing compartment inlet cavity 72 and the bearing compartment 76 on the other side, facilitates thermal insulation of the bearing compartment 76 from the high temperatures of the scroll 38 and the combustion gas flow 58 therethrough. In some embodiments, the insulating cavity 78 may contain an insulating material 80 (e.g., an insulating blanket) disposed therein to facilitate further thermal insulation of the bearing compartment 76. The turbine case 66 and an outer turbine wall 82 form an outer turbine cavity 84 therebetween (e.g., radially therebetween). The outer turbine cavity 84 is disposed radially outward of the turbine case 66 and axially coincident with the bladed turbine rotor 52.

Figure 5:
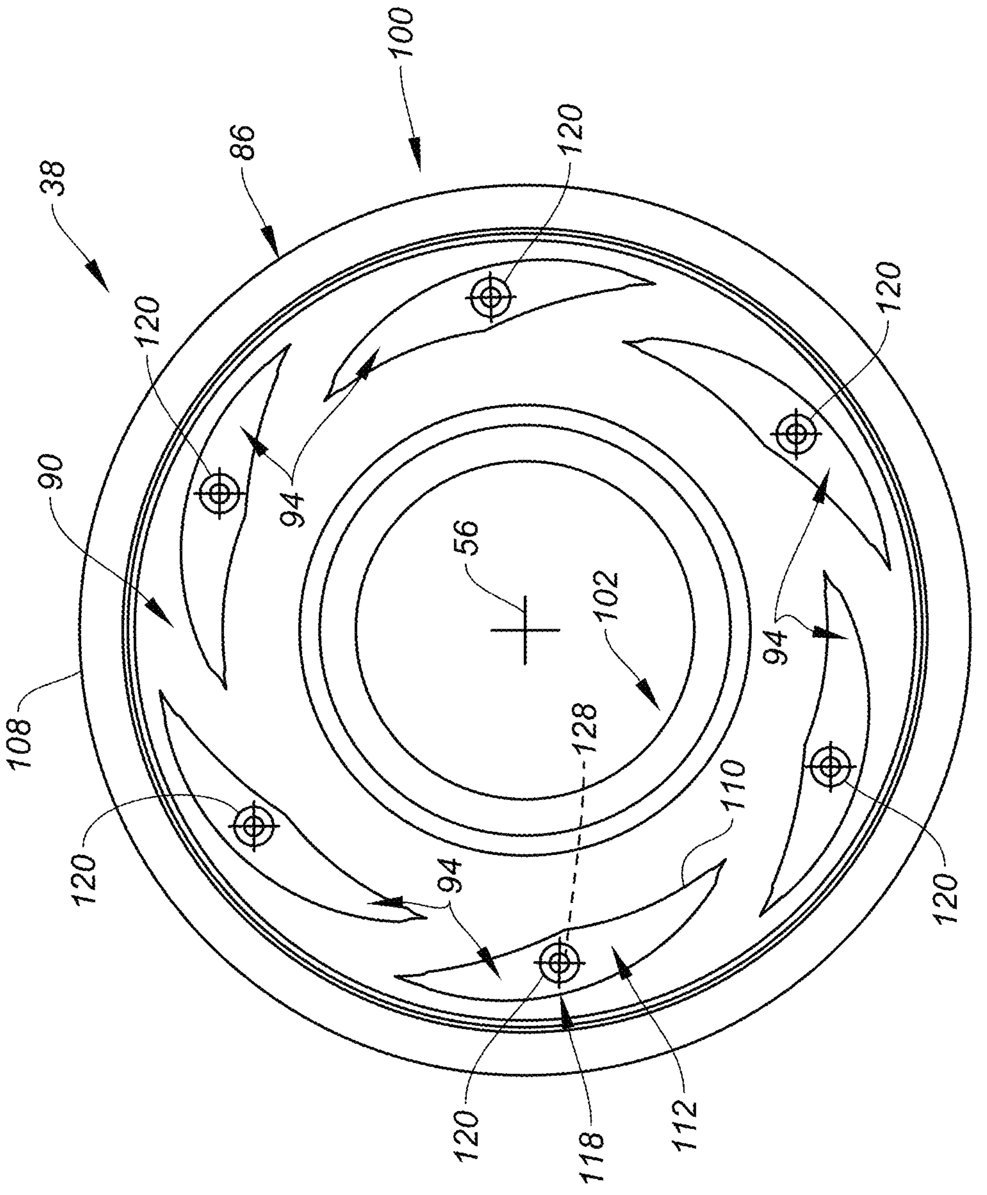
FIG. 5 illustrates a cross-sectional view of a scroll of the exhaust assembly of FIG. 4 taken along Line 5-5 of FIG. 4, in accordance with one or more embodiments of the present disclosure.
Figure 6:
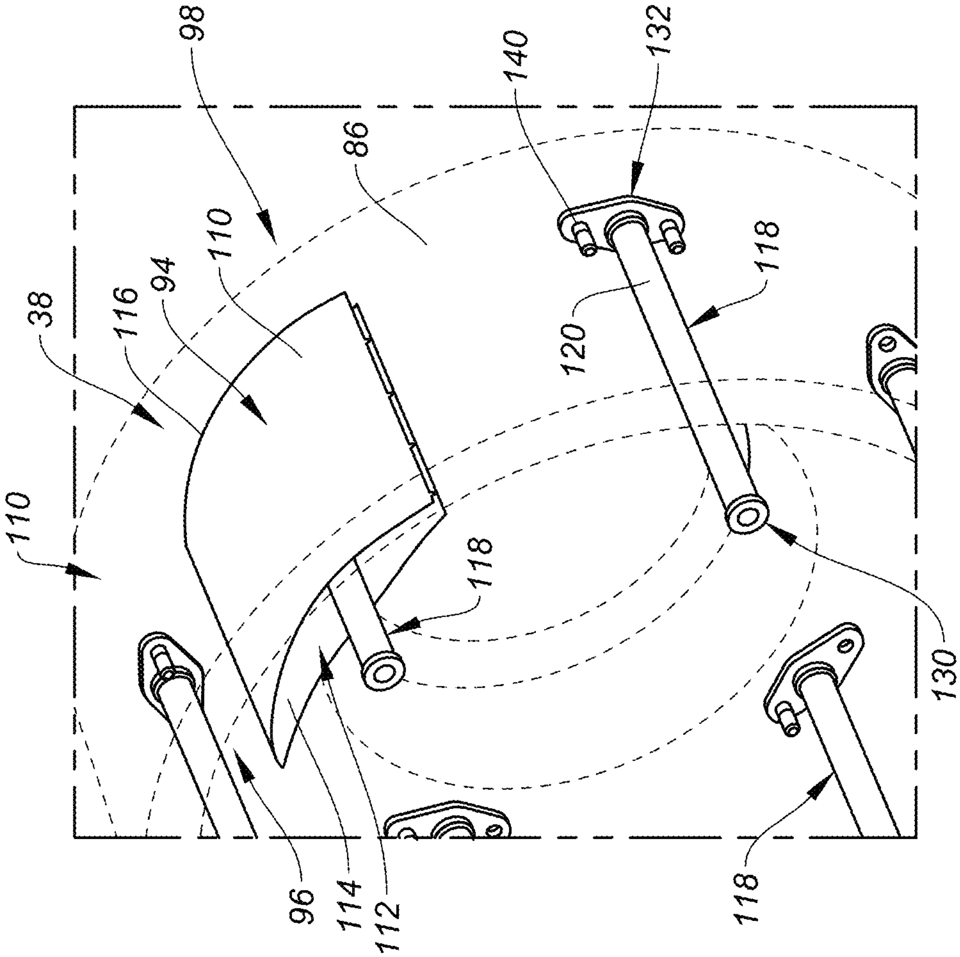
FIG. 6 illustrates a partial cutaway, perspective view of the scroll, in accordance with one or more embodiments of the present disclosure.

With additional reference to FIGS. 5 and 6, the scroll 38 is described in greater detail. FIG. 5 illustrates a cross-sectional view of the scroll 38 taken along Line 5-5 of FIG. 4. FIG. 6 illustrates a cutaway, perspective view of the scroll 38.

The scroll 38 is positioned axially between the compressor The scroll 38 embodiment shown in FIGS. 4-6 may be described as a single port annular scroll (i.e., the combustion gas flow 58 from the exhaust manifold 34 may be directed into a single port of the annular scroll 38; see also FIGS. 2-3). The scroll 38 is configured to organize the combustion gases to produce a flow of combustion gases exiting the scroll 38 and entering the turbine 42 at a high tangential velocity (e.g., a high exit swirl). The scroll 38 includes a scroll body 86 forming a scroll inlet 88, a generally annularly extending flow channel 90, and a scroll outlet 92. The scroll 38 further includes a plurality of stator vanes 94.

The scroll body 86 extends (e.g., axially extends) between and to a first axial end 96 of the scroll body 86 and a second axial end 98 of the scroll body 86. The scroll body 86 extends (e.g., radially extends) between and to an outer radial end 100 of the scroll body 86 and an inner radial end 102 of the scroll body 86. The scroll body 86 may be mounted to the bearing compartment housing 64, for example, at (e.g., on, adjacent, or proximate) the first axial end 96. The scroll body 86 may be mounted to the turbine case 66, for example, at (e.g., on, adjacent, or proximate) the second axial end 98. For example, the outer turbine wall 82 may be mounted to the scroll body 86 at (e.g., on, adjacent, or proximate) the second axial end 98 or otherwise formed by the scroll 38 (e.g., as a unitary component with the scroll body 86).

The scroll body 86 includes a first side wall 104, a second side wall 106, and an outer wall 108 forming the flow channel 90. The first side wall 104 extends circumferentially about (e.g., completely around) the axis 56 along the first axial end 96 and the inner radial end 102. The first side wall 104 forms a portion of the insulating cavity 78. The second side wall 106 extends circumferentially about (e.g., completely around) the axis 56 along the second axial end 98. The second side wall 106 forms a portion of the outer turbine cavity 84. The outer wall 108 extends circumferentially about (e.g., completely around) the axis 56 along the outer radial end 100. The flow channel 90 extends within the scroll body 86 from the scroll inlet 88 to the scroll outlet 92. The scroll outlet 92 is connected in fluid communication with the turbine 42.

The stator vanes 94 are disposed in the flow channel 90 and circumferentially distributed about the axis 56. Each of the stator vanes 94 includes a hollow vane body 110 forming an internal passage 112. The vane body 110 extends (e.g., axially extends) between and to a first axial end 114 of the vane body 110 and a second axial end 116 of the vane body 110. The first axial end 114 is mounted to or otherwise disposed at (e.g., on, adjacent, or proximate) the first side wall 104. The second axial end 116 is mounted to or otherwise disposed at (e.g., on, adjacent, or proximate) the second side wall 106. Alternatively, the vane body 110 may be formed as a unitary component with the scroll body 86. The internal passage 112 extends through the first side wall 104, the vane body 110, and the second side wall 106. For example, the internal passage 112 may be connected in fluid communication with the insulating cavity 78. FIG. 6 illustrates one of the stator vanes 94 disposed in the internal passage 112, with a remainder of the stator vanes 94 omitted from FIG. 6 for clarity.

The turbocompressor unit 40 further includes a plurality of tube assemblies 118. The tube assemblies 118 may include a tube assembly for each of the stator vanes 94.

Alternatively, the tube assemblies 118 may include a tube assembly for each of a subset of the stator vanes 94. Each of the tube assemblies 118 includes a tubular body 120, a sealing body 122, and a first seal 124. Each of the tube assemblies 118 may additionally include a second seal 126.

The tubular body 120 extends along a tube axis 128 between and to a first axial end 130 of the tubular body 120 and a second axial end 132 of the tubular body 120. The tube axis 128 may be parallel to or substantially parallel to the axis 56. The first axial end 130 is disposed within the sealing body 122 and proximate the bearing compartment housing 64 interface between the bearing compartment inlet cavity 72 and the insulating cavity 78. The second axial end 132 is disposed at (e.g., on, adjacent, or proximate) the second axial end 98 and within the outer turbine cavity 84. The tubular body 120 forms an internal passage 134. The internal passage 134 extends through the tubular body 120 along the tube axis 128 from the first axial end 130 to the second axial end 132. The internal passage 134 connects the bearing compartment inlet cavity 72 in fluid communication with the outer turbine cavity 84.

Figure 7:
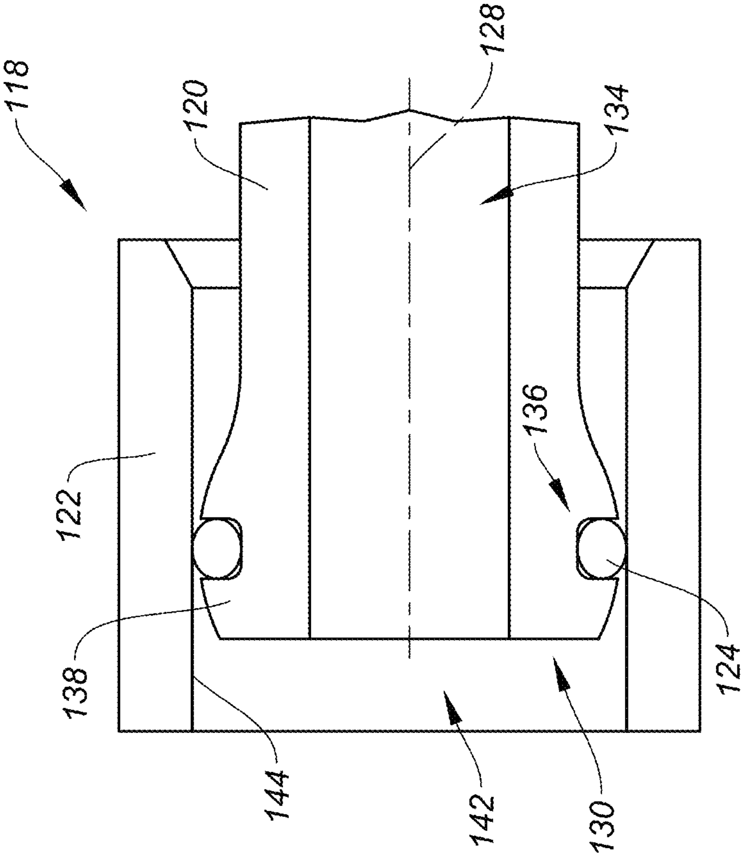
FIG. 7 illustrates a cutaway, side view of a portion of a tube assembly for the turbocompressor unit, in accordance with one or more embodiments of the present disclosure.

FIG. 7 illustrates a cutaway, side view of the first axial end 130 in greater detail. The tubular body 120 forms a seal groove 136 at (e.g., on, adjacent, or proximate) the first axial end 130. The seal groove 136 extends circumferentially about (e.g., completely around) the tube axis 128 on an exterior of the tubular body 120. The tubular body 120 may additionally form an enlarged head portion 138 (e.g., enlarged relative to surrounding portions of the tubular body 120) at (e.g., on, adjacent, or proximate) the first axial end 130. The head portion 138 may have a parti-spherical shape extending circumferentially about (e.g., completely around) the tube axis 128. This parti-spherical shape of the head portion 138 may facilitate at least some limiting pivoting motion of the tubular body 120 (e.g., the first axial end 130) relative to the sealing body 122.

Figure 8:
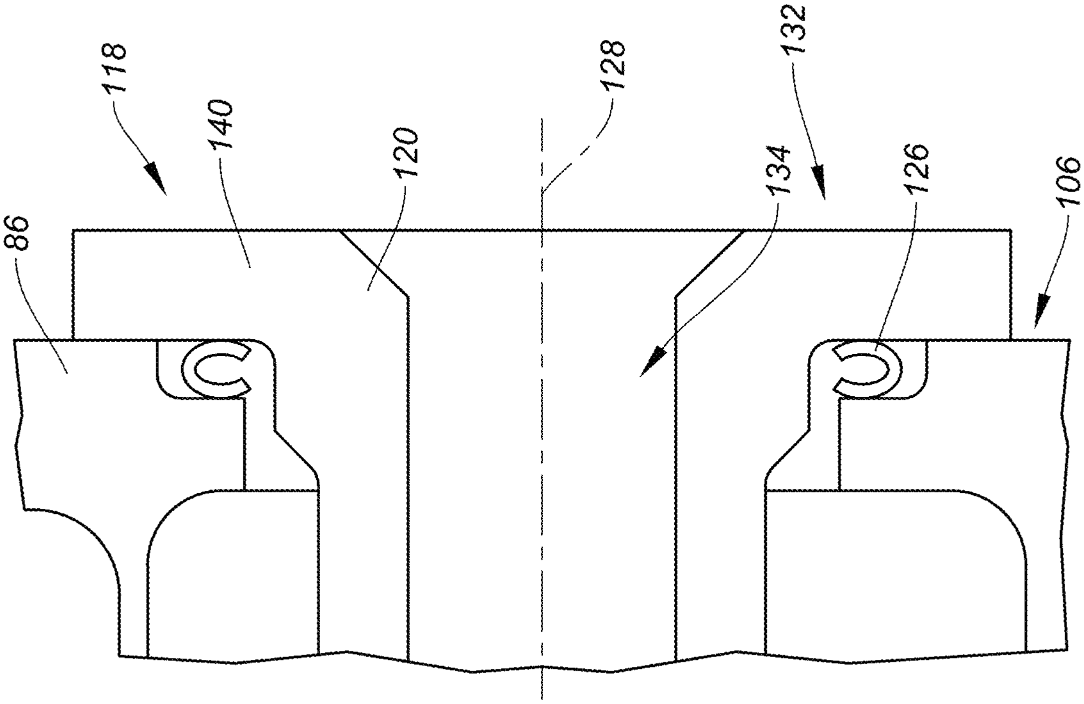
FIG. 8 illustrates a cutaway, side view of another portion of the tube assembly, in accordance with one or more embodiments of the present disclosure.

FIG. 8 illustrates a cutaway, side view of the second axial end 132 in greater detail. The tubular body 120 forms a flange 140 at (e.g., on, adjacent, or proximate) the second axial end 132. The flange 140 is mounted on the second side wall 106, for example, by one or more mechanical fasteners (e.g., bolts).

The sealing body 122 is mounted on the bearing compartment housing 64. The sealing body 122 forms an internal passage 142 extending through the sealing body 122 along the tube axis 128. The sealing body 122 includes an inner sealing surface 144 extending circumferentially about (e.g., completely around) the tube axis 128 and circumscribing the internal passage 142. The internal passage 142 is connected in fluid communication with the bearing compartment inlet cavity 72.

The first seal 124 is disposed in the seal groove 136. The first seal 124 extends circumferentially about (e.g., completely around) the tube axis 128. The first seal 124 may be configured as a resilient-material O-ring or another suitable fluid seal. The first seal 124 is disposed in sealing contact with the inner sealing surface 144 to facilitate sealing of the insulating cavity 78 from the bearing compartment inlet cavity 72 through the internal passage 142.

The second seal 126 is positioned between the flange 140 and the second side wall 106 to form a fluid seal therebetween, thereby isolating the insulating cavity 78 from fluid communication with the outer turbine cavity 84. The second seal 126 may be configured as a "C" seal, as shown in FIG. 8, or any other suitable fluid seal configuration.

In operation of the engine 26 and its turbocompressor unit 40, cooling air from the compressor 44 may be directed to one or more components, systems, and/or cavities of the turbocompressor unit 40 for cooling. For example, cooling air from the compressor 44 may be directed to the outer turbine cavity 84 to facilitate cooling of turbine 42 components and static structures. In at least some conventional aircraft propulsion systems, compressor cooling air may be routed to a turbine section using conduits, ducts, etc. radially outboard of engine components such as the scroll 38. However, for some aircraft propulsion system configurations, available space radially outboard of the engine components may be limited. For example, as shown in FIG. 4, a nacelle line 146 (e.g., the nacelle 24; see FIG. 1) of the aircraft propulsion system 20 may limit the space available for routing compressed air from the compressor 44 (e.g., the compressor outlet cavity 68) to the turbine 42 (e.g., the outer turbine cavity 84) radially outboard of the scroll 38. The present disclosure configuration of the scroll 38 and the tube assemblies 118 facilitates supplying compressed air from the compressor 44 to the outer turbine cavity 84 without the need to route separate cooling air conduits, ducts, etc. along a radial exterior of the turbocompressor unit 40. Moreover, the tube assemblies 118 facilitate fluid isolation of the insulating cavity 78 from surrounding cavities without the need to route compressor cooling air around the insulating cavity 78. The moveable interface of the tubular body 120 and the first seal 124 with the sealing body 122 accommodates thermal expansion and contraction of scroll 38 and turbocompressor unit 40 components during operation while maintaining sealing of the insulating cavity 78.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:

a turbocompressor unit including a compressor, a turbine, a rotational assembly, and a static structure, the rotational assembly rotatable about a rotational axis, the rotational assembly including a bladed compressor rotor of the compressor, a bladed turbine rotor of the turbine, and a shaft, the shaft interconnecting the bladed compressor rotor and the bladed turbine rotor, the static structure forming a first cavity and a second cavity, the first cavity connected in fluid communication with the compressor, the second cavity disposed at the turbine;

an engine exhaust assembly including an annular scroll disposed between the first cavity and the second cavity, the annular scroll including a scroll body and a plurality of hollow stator vanes, the scroll body forming a flow channel connected in fluid communication with the turbine, the plurality of hollow stator vanes disposed within the flow channel and circumferentially distributed about the rotational axis; and a tube assembly including a tubular body, the tubular body extending along a tube axis between and to a first axial tube end and a second axial tube end, the tubular body extending through one of the plurality of hollow stator vanes between and to the first cavity and the second cavity, the tubular body forming an internal passage extending along the tube axis from the first axial tube end to the second axial tube end, the internal passage connecting the first cavity in fluid communication with the second cavity.

2. The aircraft propulsion system of claim 1, wherein the scroll body extends axially between and to a first axial scroll end and a second axial scroll end, and the scroll body forms a portion of the second cavity at the second axial scroll end.

3. The aircraft propulsion system of claim 2, wherein the tubular body is mounted to the scroll body at the second axial scroll end.

4. The aircraft propulsion system of claim 2, wherein the scroll body forms a third cavity at the first axial scroll end, and the tubular body extends through the third cavity to the first cavity.

5. The aircraft propulsion system of claim 4, wherein the third cavity is a dead cavity.

6. The aircraft propulsion system of claim 1, wherein the tube assembly further includes a sealing body mounted on the static structure at the first cavity, the sealing body includes an inner sealing surface extending circumferentially about the tube axis, and the first axial tube end is disposed within the sealing body at the inner sealing surface.

7. The aircraft propulsion system of claim 6, wherein the tube assembly further includes a seal disposed at the first axial tube end, and the seal is disposed in sealing engagement with the inner sealing surface.

8. The aircraft propulsion system of claim 7, wherein the first axial tube end is axially translatable relative to the inner sealing surface along the tube axis.

9. The aircraft propulsion system of claim 1, further comprising an engine including an exhaust port, and the flow channel forms a portion of a combustion gas flow path from the exhaust port to the turbine.

10. The aircraft propulsion system of claim 1, wherein the static structure further includes a bearing assembly mounted to rotationally support the shaft, and the bearing assembly is connected in fluid communication with the first cavity.

11. An aircraft propulsion system comprising:

a turbocompressor unit including a compressor, a turbine, a rotational assembly, and a static structure, the rotational assembly rotatable about a rotational axis, the rotational assembly including a bladed compressor rotor of the compressor, a bladed turbine rotor of the turbine, and a shaft, the shaft interconnecting the bladed compressor rotor and the bladed turbine rotor, the static structure forming a first cavity and a second cavity, the first cavity connected in fluid communication with the compressor, the second cavity disposed at the turbine;

an engine exhaust assembly including an annular scroll axially between the compressor and the turbine, the annular scroll including a scroll body and a plurality of hollow stator vanes, the scroll body including a first axial side wall, a second axial side wall, and an outer wall forming a flow channel of the annular scroll, the flow channel connected in fluid communication with the turbine, the plurality of hollow stator vanes extending between and to the first axial side wall and the second axial side wall; and a tube assembly including a tubular body, the tubular body extending along a tube axis between and to a first axial tube end and a second axial tube end, the second axial tube end mounted to the second axial side wall, the tubular body extending through one of the plurality of hollow stator vanes between and to the first cavity and the second cavity, the tubular body forming an internal passage extending along the tube axis from the first axial tube end to the second axial tube end, the internal passage connecting the first cavity in fluid communication with the second cavity.

12. The aircraft propulsion system of claim 11, wherein the static structure includes a turbine case circumscribing the bladed turbine rotor, and the second cavity is disposed radially outward of the turbine case.

13. The aircraft propulsion system of claim 11, wherein the scroll body forms a third cavity, and the tubular body extends through the third cavity to the first cavity.

14. The aircraft propulsion system of claim 13, wherein the third cavity is a dead cavity.

15. The aircraft propulsion system of claim 11, wherein the static structure further includes a bearing assembly mounted to rotationally support the shaft, and the bearing assembly is connected in fluid communication with the first cavity.

16. An aircraft propulsion system comprising:

a turbocompressor unit including a compressor, a turbine, a rotational assembly, and a static structure, the rotational assembly rotatable about a rotational axis, the rotational assembly including a bladed compressor rotor of the compressor, a bladed turbine rotor of the turbine, and a shaft, the shaft interconnecting the bladed compressor rotor and the bladed turbine rotor, the static structure forming a first cavity and a second cavity, the first cavity connected in fluid communication with the compressor, the second cavity disposed at the turbine;

an engine exhaust assembly including an annular scroll disposed between the first cavity and the second cavity, the annular scroll including a scroll body and a plurality of hollow stator vanes, the scroll body forming a flow channel connected in fluid communication with the turbine, the plurality of hollow stator vanes disposed within the flow channel and circumferentially distributed about the rotational axis; and a tube assembly including a tubular body, a seal, and a sealing body, the tubular body extending along a tube axis between and to a first axial tube end and a second axial tube end, the tubular body extending through one of the plurality of hollow stator vanes between and to the first cavity and the second cavity, the tubular body forming an internal passage extending along the tube axis from the first axial tube end to the second axial tube end, the internal passage connecting the first cavity in fluid communication with the second cavity, the tubular body forms a seal groove at the first axial tube end, the seal is disposed in the seal groove, the sealing body is mounted on the static structure at the first cavity, the seal is sealingly engaged with the sealing body, and the first axial tube end is moveable within the sealing body.

17. The aircraft propulsion system of claim 16, wherein the tubular body is mounted to the scroll body.

18. The aircraft propulsion system of claim 16, wherein the scroll body extends axially between and to a first axial scroll end and a second axial scroll end, and the scroll body forms a portion of the second cavity at the second axial scroll end.

19. The aircraft propulsion system of claim 18, wherein the tubular body is mounted to the scroll body at the second axial scroll end.

20. The aircraft propulsion system of claim 16, further comprising an engine including an exhaust port, and the flow channel forms a portion of a combustion gas flow path from the exhaust port to the turbine.

* * * * *